UNITED STATES PATENT OFFICE.

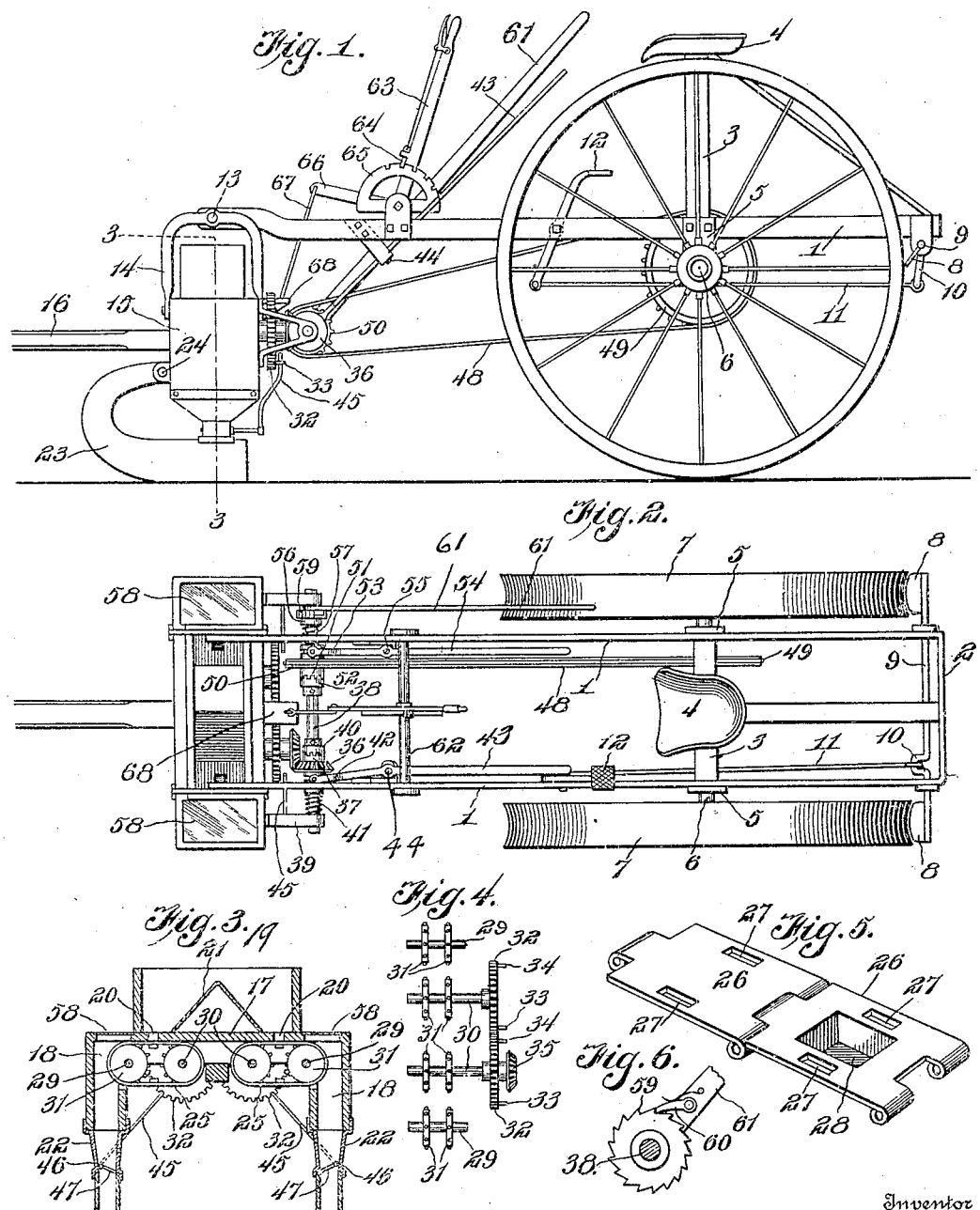

JOHN N. STOUT, OF LEWIS, INDIANA.

CORN-PLANTER.

948,260.  Specification of Letters Patent.  Patented Feb. 1, 1910.

Application filed June 23, 1909. Serial No. 503,892.

*To all whom it may concern:*

Be it known that I, JOHN N. STOUT, a citizen of the United States, residing at Lewis, in the county of Vigo and State of Indiana, have invented new and useful Improvements in Corn-Planters, of which the following is a specification.

This invention relates to a corn planter adapted for simultaneously planting two rows of corn in hills at a time in proper relation to the hills of adjacent rows without the use of wires, anchors or other devices commonly employed to obtain a check-row action.

The object of the invention is to provide a planter which will plant the seed in the rows at accurate distances apart, and wherein the seed dropping action of the machine may be readily observed by the operator and the dropping action regulated as occasion may require.

With these and other objects in view, the invention consists of the features of construction, combination and arrangement of parts hereinafter fully described and claimed, reference being had to the accompanying drawing, in which:—

Figure 1 is a side elevation of a planter embodying my invention. Fig. 2 is a top plan view of the same. Fig. 3 is a vertical transverse section through the seeding mechanism on line 3—3 of Fig. 1. Fig. 4 is a detail view of the gearing for driving the same. Fig. 5 is a detail view of a portion of one of the feed belts. Fig. 6 is a detail view of the means for advancing the drive shaft.

Referring to the drawing, my improved planter comprises a main frame formed of a pair of parallel longitudinal side bars 1 connected by a rear cross bar 2 and an intermediate cross bar or brace 3, which cross bar or brace 3 supports a driver's seat 4. Depending from the side bars below said cross brace are bearing brackets 5 in which is journaled a transverse drive shaft or axle 6 carrying at its ends supporting and covering wheels 7. The rims of these wheels are concaved in cross section to compress the earth and close the furrows after the deposit of the seed in the usual manner. Scrapers 8 are provided for removing the adhering earth from the rims of the wheels and comprise blocks mounted on the opposite ends of a transverse rock shaft 9 journaled in the side bars and having a crank 10 coupled by a connecting rod 11 with a foot lever 12 pivotally mounted on the frame, so that the driver may operate said lever to throw the scrapers into and out of engagement with the wheel rims in an obvious manner.

The forward ends of the bars 1 are provided with pivots 13 on which are pivotally mounted depending U-shaped brackets or yokes 14, which carry a seeder frame and casing 15, to which the drive pole or tongue 16 of the implement is connected in any preferred manner.

The casing 15 consists of a transverse board or plate 17 having at opposite sides depending conducting tubes 18 forming passages for the feed of the seed to the furrow opening devices. Centrally mounted upon this board or plate is a hopper 19 communicating with a pair of discharge openings 20 formed in the board at opposite sides of the hopper. Between these discharge openings an inclined or V-shaped deflector 21 is provided in the hopper for guiding the seed to the openings.

The conducting tubes 18 have attached to their lower ends dropper tubes 22 which are supported upon and communicate with shoes or furrow openers 23 pivotally mounted on said arms, as at 24. It will thus be understood that the seeder frame and furrow and conductor shoes are pivotally mounted upon the front end of the main frame to support such end of the main frame and to have freedom of motion to accommodate themselves to irregularities in the surface of the ground.

Arranged below each discharge opening 20 is an endless feed belt 25, preferably made of a series of pivotally connected metallic links 26 formed with sprocket teeth receiving openings 27. Two of the links of the belt, arranged at diametrically opposite points therein, are each formed with a pocket or cup 28 to receive a determined amount of seed. These pockets or cups are adapted on each half revolution of the belt to respectively aline with and receive a discharge of seed from the coöperating opening 20, which latter is at all other times closed against the discharge of seed by the belt. The belts are arranged transversely of the seeder frame in alinement with each other and with their outer ends projecting into the conducting tubes 18 for the discharge of the seed contained in the cups thereinto.

Each belt is mounted upon a pair of shafts 29 and 30 carrying sprocket wheels 31 to engage the openings 27 and thus transmit motion to the belts. The inner shaft 30 of each belt projects at its inner end in rear of the seeder frame and between the forward ends of the bars 1 and carries a spur drive gear 32. The two spur gears 32 are in meshing engagement, and the inner face of each is provided at diametrically opposite sides of its center with striker pins 33 and 34. The inner end of one of the shafts 30 carries a beveled pinion 35 meshing with a beveled drive gear 36 carried by a clutch sleeve 37 loosely mounted on a transverse power transmission shaft 38 journaled in bearing brackets 39 carried by the seeder frame, which clutch sleeve is toothed to engage a clutch collar 40 fixed to said shaft. The sleeve 37 is movable inwardly for engagement with the collar 40 and outwardly for disengagement therefrom and is normally pressed inwardly by a coiled spring 41 surrounding the adjacent end of the shaft between said sleeve and the contiguous bearing bracket 39, the construction being such that when the clutch members are in engagement, motion will be transmitted through the gearing to both belts to move their upper stretches outwardly, as will be readily understood. The outer end of the sleeve 37 is annularly grooved to receive engaging members on the forked end 42 of a laterally movable clutch shifting member 43 pivotally mounted on the main frame, as at 44, the free end of said lever being arranged so as to be conveniently operated by the driver occupying the seat 4.

On the rotation of the gears 32, the pins 33 and 34 thereon, at each half revolution thereof, come in contact with trip arms 45 carried by rock shafts 46, which shafts are journaled in the dropper tubes 22 and carry within the said tubes dropper valves 47. When the striker pins are out of engagement with the arms 45, the latter are held by gravity in retracted position to maintain the valves 47 closed. The striker pins are so arranged as to engage and trip the arms 45 to open the valve after the belts have dropped their charges of seed into the dropper tubes, so that two rows of corn may be simultaneously planted in the furrows formed by the shoes 23 at regular intervals apart.

The shaft 38 is driven from the primary shaft or axle 6 by a sprocket chain 48 engaging a sprocket wheel 49 on said shaft 6 and a sprocket pinion 50 on the shaft 38. The pinion 50 is carried by a clutch sleeve 51 slidable on the shaft 38 and toothed to engage a toothed clutch collar 52 secured to said shaft. The outer end of the sleeve 51 is annularly grooved to receive pins or projections upon the forked end 53 of a lever 54 pivotally mounted upon the adjacent side bar of the main frame, as at 55. A shoulder 56 is formed or provided upon the adjacent extended end of the shaft 38, and between said shoulder and the outer end of the sleeve 51 is arranged a coiled spring 57 operating to normally hold the sleeve in engagement with the collar 52 to secure the sprocket wheel 50 to the shaft 38 for rotation therewith. By means of the lever 54, the driver from his seat may throw the sleeve out of engagement with the collar to disengage the pinion 50 from the shaft to throw the drive gearing out of operation or to temporarily arrest the motion thereof for retarding the action of the planting devices when occasion requires.

In the operation of the machine, it will be understood that the implement is drawn across the field and parallel furrows at determined distances apart formed by the shoes 23, into which furrows, through the operation of the intermediately actuated seed mechanism, charges of corn are dropped at determined intervals apart and then covered in the usual manner by the wheels 7. In order that the feed action of the belts 25 may be viewed, glass or other transparent observation panels 58 are provided at the upper ends of the passages 18, enabling the operator to determine at any time whether the parts are in position to drop the seed in alinement with the points of deposit of the seed in the previously planted row or rows. If it should be found necessary to retard the operation of the dropping devices for the purpose of securing an accurate alinement, this may be accomplished by throwing the gearing temporarily out of action in the manner above described. It is sometimes, however, necessary to advance the motion of the parts for the same purpose, to which end a ratchet wheel 59 is fixed upon the shaft 38 and is arranged to be engaged by a spring pressed pawl 60 on an adjusting lever 61 pivotally engaging said shaft. By rocking this lever back and forth, the motion of the shaft 38 may be readily and conveniently advanced to regulate the operation of the belts 25 accordingly. A transverse rod 62 is fixed to the side bars 1 in rear of the shaft 38 and has pivotally mounted thereon a lever 63 provided with a pawl 64 to engage a segmental rack 65 fixed to the rod. The lever is provided with an arm 66 connected by a link rod 67 with an arm or projection 68 projecting rearwardly from the seeder frame, by which the latter may be raised or lowered to regulate the depth of penetration of the earth by the furrow openers or bodily raised to elevate the same above the surface of the earth in transporting the implement from place to place.

From the foregoing description, taken in connection with the accompanying drawing, the construction and mode of operation of my improved planter will be readily understood and it will be seen that the invention provides a simple construction of planter of this character by which a plurality of rows may be simultaneously planted without the use of wires, anchors or other devices commonly employed for this purpose.

I claim:

1. A planter comprising a main frame, a driving axle journaled thereon and provided with supporting and covering wheels, a hopper frame pivotally mounted upon the forward end of the main frame, furrow opening shoes connected with the hopper and in communication therewith through the feed passage, feed belts for transferring charges of corn from the hopper to said passages, dropper valves in said passages, trip arms connected with said valves, intermeshing gears for actuating the feed belts, striker pins carried by said gears for operating the trip arm, a transverse shaft, clutch gearing for connecting said shaft with the intermeshing gears, clutch controlled gearing for driving said shaft from the driving axle, and means for adjusting the hopper and associated parts.

2. A planter comprising a main frame, a driving axle journaled thereon, and provided with supporting and covering wheels, a hopper frame pivotally mounted upon the forward end of the main frame, furrow opening shoes connected with the hopper in communication therewith through the feed passages, feed belts for transferring charges of corn from the hopper to said passages, the latter being provided with transparent observation panels, dropper valves in said passages, trip arms connected with said valves, intermeshing gears for actuating the feed belts, striker pins carried by said gears for operating the trip arm, a transverse shaft, clutch gearing for connecting said shaft with the intermeshing gears, clutch controlled gearing for driving said shaft from the driving axle, and means for adjusting the hopper and associated parts.

3. A planter comprising a main frame, a driving axle journaled thereon and provided with supporting and covering wheels, a hopper frame pivotally mounted upon the forward end of the main frame, furrow opening shoes connected with the hopper and in communication therewith through feed passages, feed belts for transferring charges of corn from the hopper to said passages, the latter being provided with transparent observation panels, dropper valves in said passages, trip arms connected with said valves, intermeshing gears for actuating the feed belts, striker pins carried by said gears for operating the trip arm, a transverse shaft, clutch gearing for connecting said shaft with the intermeshing gears, clutch controlled gearing for driving said shaft from the driving axle, means for adjusting the hopper and associated parts, and means for advancing the motion of said transverse shaft.

In testimony whereof I affix my signature in presence of two witnesses.

JOHN N. STOUT.

Witnesses:
ELMER A. STOUT,
MELVIN E. JEAN.